United States Patent
Cooper

(10) Patent No.: US 9,132,787 B2
(45) Date of Patent: Sep. 15, 2015

(54) KEYBOARD MOUNTING APPARATUS

(75) Inventor: Jeramie Cooper, Stevens Point, WI (US)

(73) Assignee: L&P PROPERTY MANAGEMENT COMPANY, South Gate, CA (US)

( * ) Notice: Subject to any disclaimer, the term of this patent is extended or adjusted under 35 U.S.C. 154(b) by 139 days.

(21) Appl. No.: 13/038,067

(22) Filed: Mar. 1, 2011

(65) Prior Publication Data

US 2012/0223200 A1   Sep. 6, 2012

(51) Int. Cl.
- B60N 3/00   (2006.01)
- B60R 11/02   (2006.01)
- F16M 13/00   (2006.01)
- A47B 21/03   (2006.01)
- B60R 11/00   (2006.01)

(52) U.S. Cl.
CPC . *B60R 11/02* (2013.01); *B60N 3/00* (2013.01); *B60N 3/005* (2013.01); *B60R 11/0252* (2013.01); *F16M 13/00* (2013.01); *A47B 2021/0321* (2013.01); *B60R 2011/001* (2013.01); *B60R 2011/0082* (2013.01)

(58) Field of Classification Search
CPC ...... B60N 3/00; B60N 3/005; B60R 11/0252; A47B 2021/0321; F16M 13/00
USPC ........... 248/118.1, 118.3, 918, 678, 680, 681, 248/346.01, 118
See application file for complete search history.

(56) References Cited

U.S. PATENT DOCUMENTS

| | | | | |
|---|---|---|---|---|
| 756,486 | A * | 4/1904 | Fleming | 248/456 |
| 4,467,727 | A * | 8/1984 | Strommer | 108/23 |
| 4,890,559 | A * | 1/1990 | Martin | 108/44 |
| D320,928 | S * | 10/1991 | Boscacci et al. | D8/363 |
| 5,092,652 | A * | 3/1992 | Macaluso | 297/146 |
| 5,375,800 | A * | 12/1994 | Wilcox et al. | 248/118.1 |
| 5,386,785 | A * | 2/1995 | Naor | 108/44 |
| 5,487,521 | A * | 1/1996 | Callahan | 248/441.1 |
| 5,611,650 | A | 3/1997 | Perkins et al. | |
| 5,697,233 | A * | 12/1997 | Albert et al. | 70/58 |
| 5,941,618 | A | 8/1999 | Cheng | |
| 6,038,983 | A * | 3/2000 | Lendl | 108/44 |
| 6,148,739 | A * | 11/2000 | Martin | 108/50.01 |
| 6,199,809 | B1 | 3/2001 | Hung | |
| 6,260,486 | B1 * | 7/2001 | Boos et al. | 108/42 |

(Continued)

OTHER PUBLICATIONS

Datalux Press Release, Datalux Corporation Introduces New Tracer, Sep. 9, 2008, 2 pgs.

(Continued)

*Primary Examiner* — Terrell McKinnon
*Assistant Examiner* — Eret McNichols
(74) *Attorney, Agent, or Firm* — Michael Best & Friedrich LLP

(57) ABSTRACT

A keyboard mounting assembly includes a base having a body portion with an edge, and a keyboard tray having a support portion configured to engage a keyboard. The keyboard tray further includes an edge-engaging portion configured to releasably engage the edge of the base for pivotal movement between a first position, in which the body portion of the base and the support portion of the keyboard tray are not parallel to one another, and a second position, in which the body portion of the base and the support portion of the keyboard tray are generally parallel to one another. The assembly further includes an interlock mechanism between the base and the keyboard tray that is operable to releasably secure the base and the keyboard tray in the second position.

25 Claims, 8 Drawing Sheets

(56) References Cited

U.S. PATENT DOCUMENTS

| | | | |
|---|---|---|---|
| 6,279,800 B1* | 8/2001 | Lee | 224/276 |
| 6,336,618 B1 | 1/2002 | Barber | |
| 6,343,775 B1 | 2/2002 | Jones et al. | |
| 6,382,580 B1 | 5/2002 | Wisniewski | |
| 6,585,212 B2 | 7/2003 | Carnevali | |
| 6,760,596 B1* | 7/2004 | Fiorini et al. | 455/522 |
| 6,814,377 B2 | 11/2004 | Silverman et al. | |
| 6,905,102 B2 | 6/2005 | Lin | |
| 6,926,244 B1* | 8/2005 | O'Neill | 248/346.01 |
| 7,007,912 B1* | 3/2006 | Giuliani et al. | 248/552 |
| 7,175,152 B2 | 2/2007 | Dittmer | |
| 7,317,613 B2 | 1/2008 | Quijano et al. | |
| 7,562,852 B2 | 7/2009 | Wang | |
| 7,571,522 B2 | 8/2009 | Carnevali | |
| 7,575,205 B2 | 8/2009 | Kirchhoff | |
| 7,673,838 B2 | 3/2010 | Oddsen, Jr. et al. | |
| 7,823,844 B2 | 11/2010 | Carnevali | |
| 7,841,569 B2 | 11/2010 | Mileos et al. | |
| 8,079,312 B2* | 12/2011 | Long | 108/44 |
| 8,746,645 B2* | 6/2014 | Knych | 248/346.01 |
| 2001/0003961 A1* | 6/2001 | Hodge et al. | 108/97 |
| 2001/0042812 A1* | 11/2001 | Perzewski | 248/27.1 |
| 2003/0001064 A1* | 1/2003 | Book | 248/460 |
| 2006/0060113 A1* | 3/2006 | Chang | 108/9 |
| 2009/0084291 A1* | 4/2009 | Long | 108/44 |
| 2009/0127418 A1* | 5/2009 | Wang | 248/310 |
| 2009/0173866 A1* | 7/2009 | Huang | 248/371 |
| 2010/0219320 A1* | 9/2010 | Knych | 248/440.1 |
| 2010/0288902 A1* | 11/2010 | Liu | 248/349.1 |
| 2011/0056412 A1* | 3/2011 | Grammer et al. | 108/6 |
| 2011/0126739 A1* | 6/2011 | Korpi | 108/6 |
| 2011/0235250 A1* | 9/2011 | Burgess et al. | 361/679.01 |
| 2012/0210914 A1* | 8/2012 | Hamilton et al. | 108/50.11 |
| 2012/0261541 A1* | 10/2012 | Lai | 248/346.5 |

OTHER PUBLICATIONS

Datalux Tracer Keyboard Features, Website pages describing Datalux Tracer Keyboard, available at least as early as Mar. 1, 2010, 4 pgs.

Gamber-Johnson Installation Instructions Form # INST4, Sep. 4, 1997, 2 pgs.

Gamber-Johnson Part Drawings for Keyboard 2 Mount, available at least as early as Mar. 1, 2010, 3 pgs.

Gamber-Johnson Part Drawings for Keyboard 3 Mount, available at least as early as Mar. 1, 2010, 3 pgs.

Havis Keyboard Mounting Tray for Panasonic, Website pages describing Havis Keyboard Mounting Tray Part # C-3329-PAN, available at least as early as Mar. 1, 2010, 3 pgs.

Havis Quick Release Slide for Panasonic Keyboard, Website pages describing Havis Quick Release Keyboard Part # C-KBM-103, available at least as early as Mar. 1, 2010, 2 pgs.

Havis—Shields New Product Supplement, Jun. 1, 2006, pp. 12-14.

Southco R4 Push-to-Close Latch, Southco Product Catalog, pp. 122 and 125, available at least as early as Mar. 1, 2010.

* cited by examiner

KEYBOARD MOUNTING APPARATUS

BACKGROUND

The present invention relates to an apparatus for mounting a keyboard to a support member.

There are numerous applications in which a computer keyboard can be mounted to a support structure. One such application is keyboards that are used in vehicles.

SUMMARY

In one embodiment, the invention provides a keyboard mounting assembly including a base having a body portion with an edge, and a keyboard tray having a support portion configured to engage a keyboard. The keyboard tray further includes an edge-engaging portion configured to releasably engage the edge of the base for pivotal movement between a first position, in which the body portion of the base and the support portion of the keyboard tray are not parallel to one another, and a second position, in which the body portion of the base and the support portion of the keyboard tray are generally parallel to one another. The assembly further includes an interlock mechanism between the base and the keyboard tray that is operable to releasably secure the base and the keyboard tray in the second position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
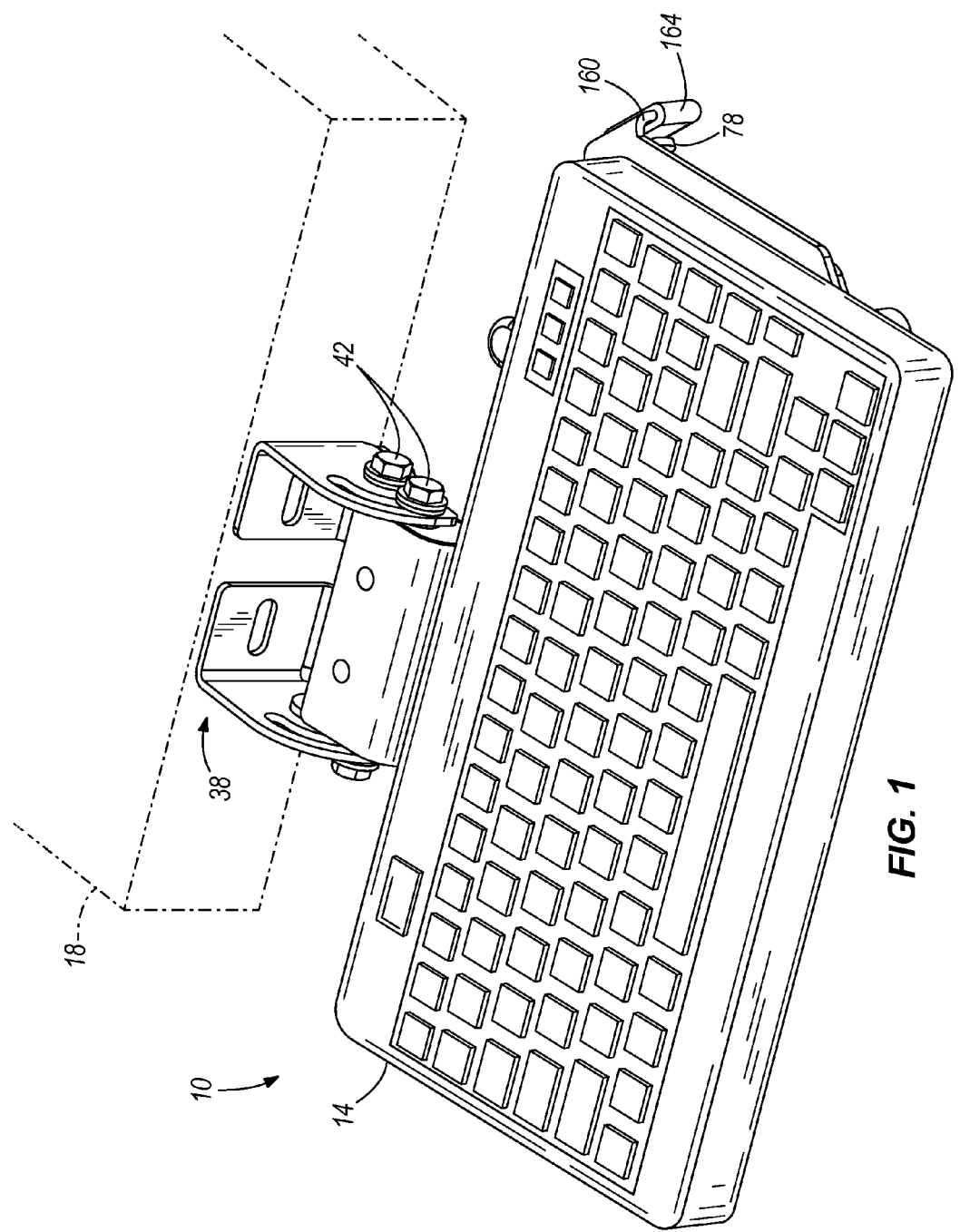
FIG. 1 is a top perspective view of a keyboard mounting apparatus embodying the invention.

FIGS. 1-4 illustrate a keyboard mounting assembly 10 configured for mounting a computer keyboard 14 to a support member 18 (see FIG. 1). The support member 18 can vary for different applications. For example, the support member 18 can take the form of a computer docking station or a computer mounting structure secured in a vehicle, a mobile cart or stand, a desk, a wall, and the like.

Figure 4:
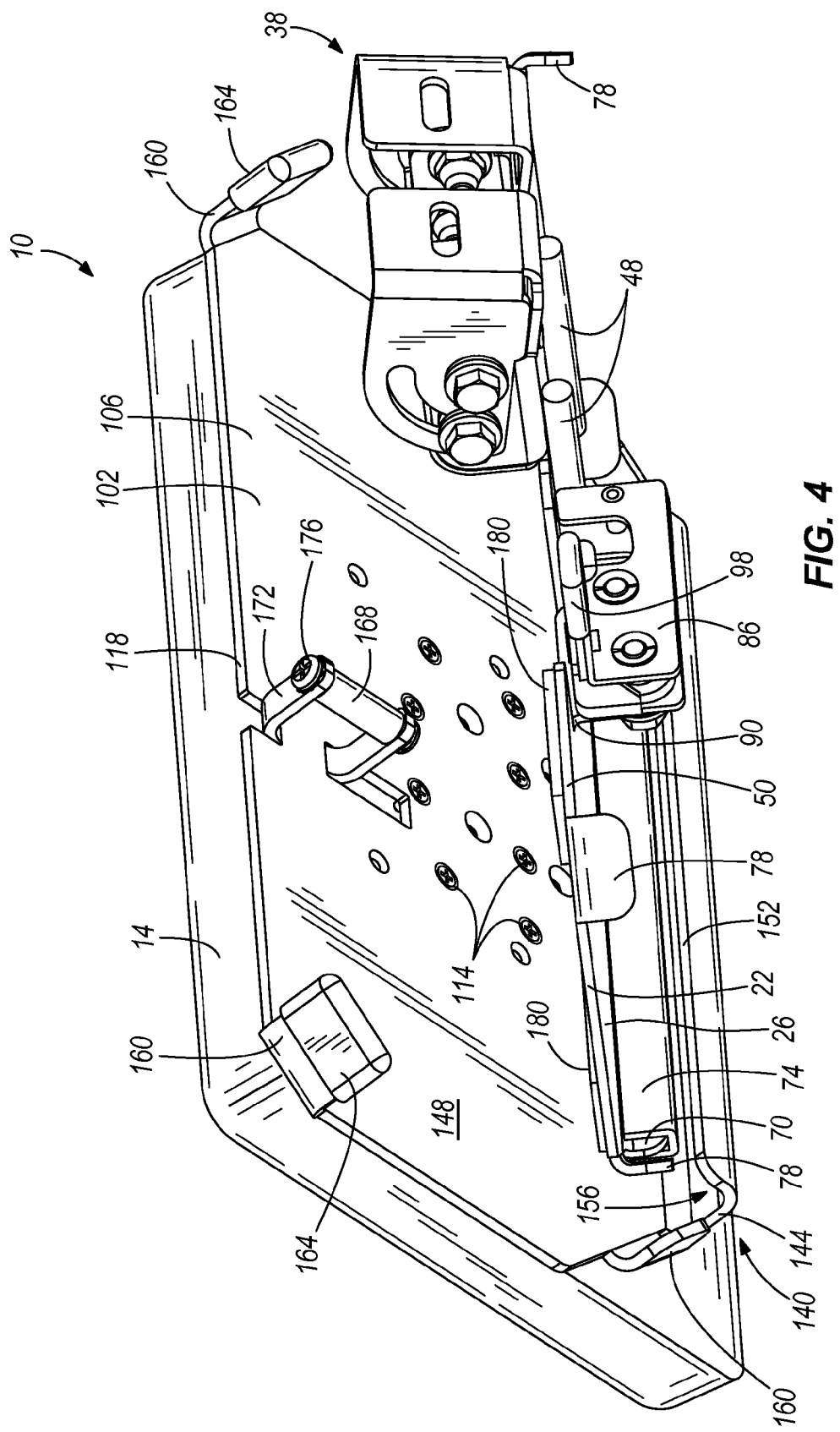
FIG. 4 is a perspective view similar to FIG. 3, showing a disengaged orientation of components of the keyboard mounting apparatus.
Figure 5:
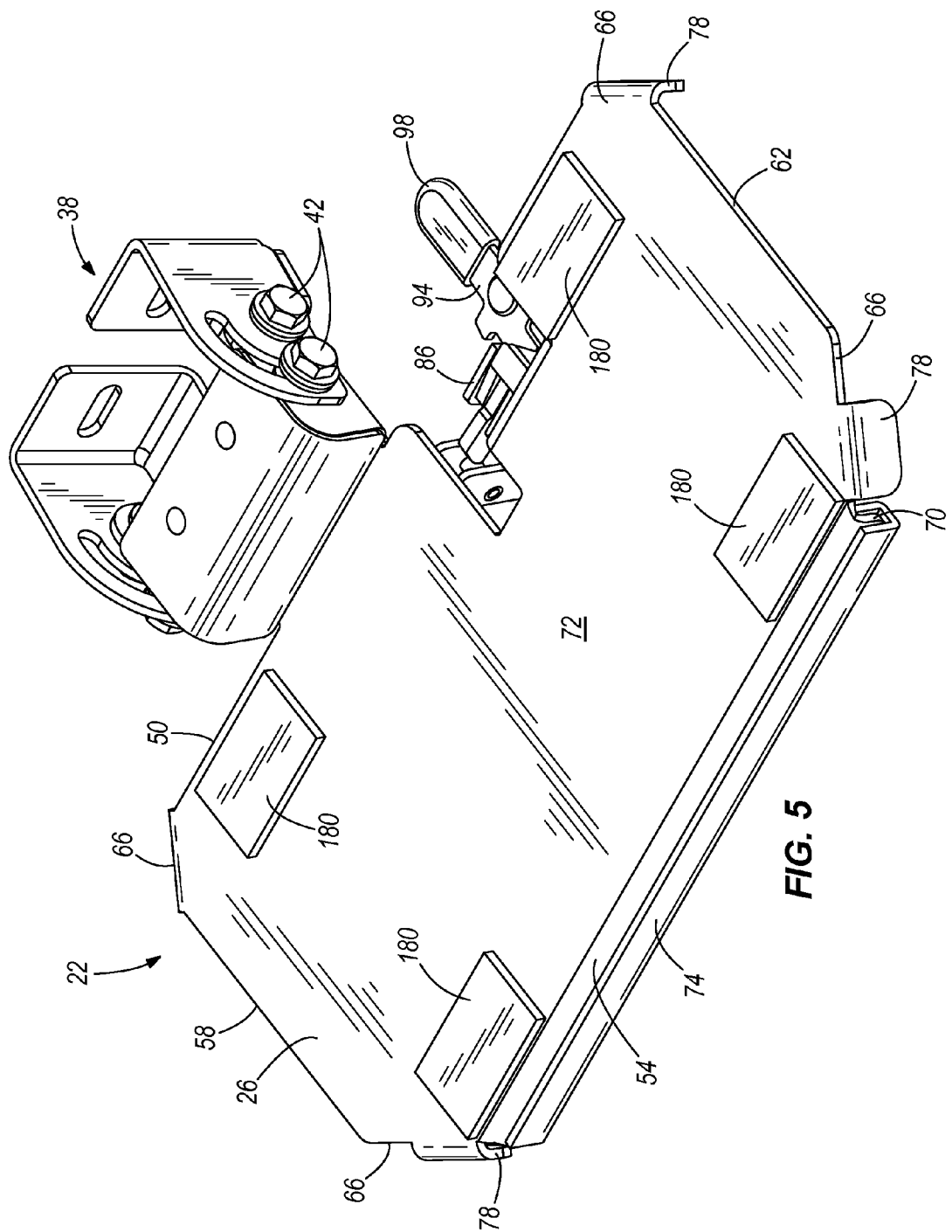
FIG. 5 is a perspective view of the keyboard base assembly of the keyboard mounting apparatus of FIG. 1.
Figure 6:
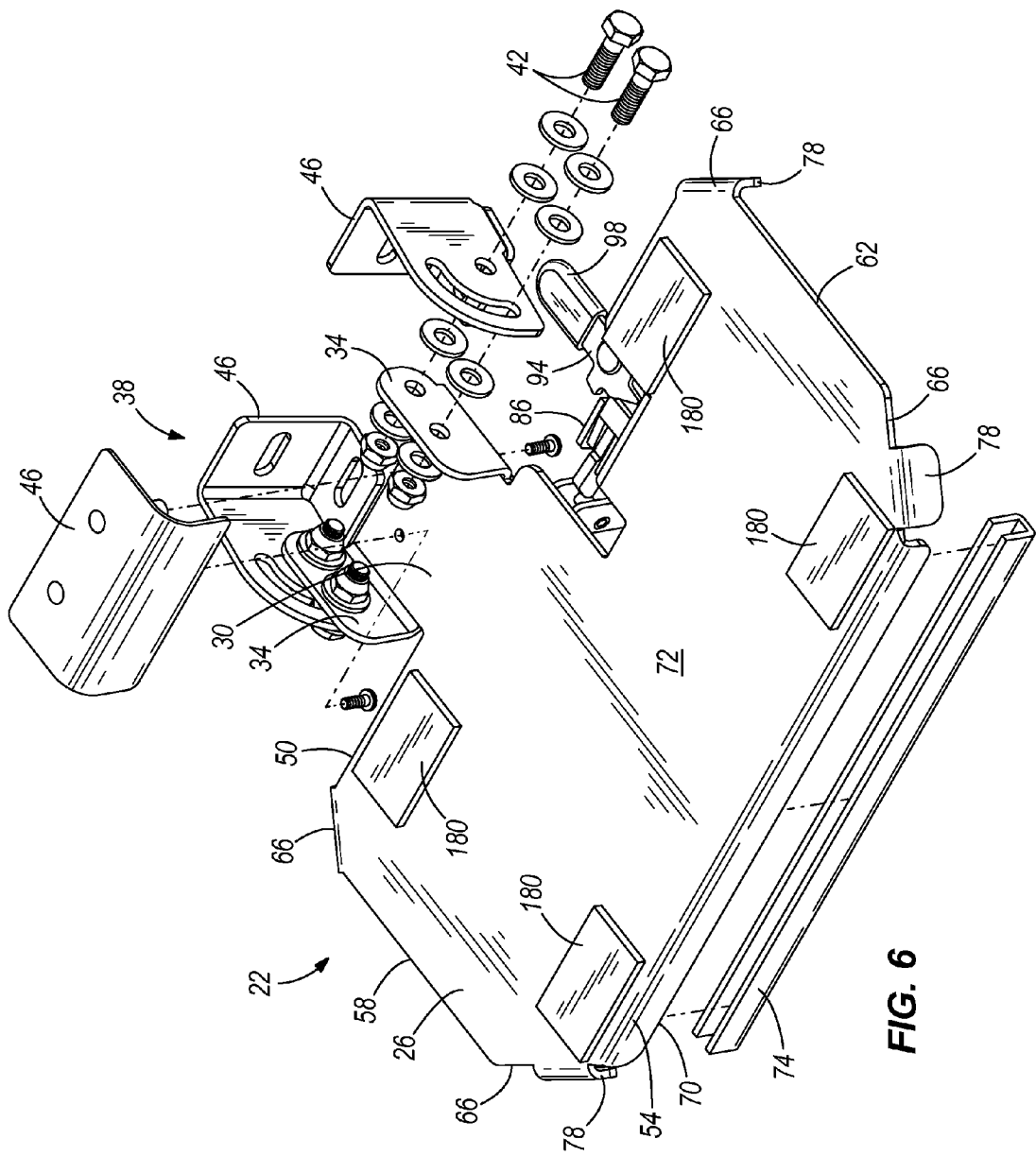
FIG. 6 is an exploded view of the keyboard base assembly of FIG. 5.

With reference to FIGS. 5 and 6, the keyboard mounting assembly 10 includes a base 22 having a generally planar body portion 26. The body portion 26 includes an extension portion 30 (see FIG. 6) with one or more mounting flanges 34 configured to receive a mounting bracket 38. The mounting bracket 38 is coupled to the flanges 34 using fasteners 42. The illustrated mounting bracket 38 is formed from a plurality of mounting bracket members 46 (see FIG. 6) sized, configured, and arranged for mounting the base 22 to the support member 18. One of skill in the art will understand that the mounting bracket 38 and the flanges 34 can be configured in a number of different ways depending upon the particular support member 18 and the particular application for the keyboard mounting assembly 10. One or more reinforcing members, in the form of rods 48 (see FIGS. 2 and 4), are coupled to the underside of the body portion 26 (e.g., by welding, brazing, etc.) to provide additional structural support and reinforcement to an area adjacent the extension portion 30.

Still referring to FIGS. 5 and 6, the body portion 26 has a first or rear edge 50 from which the extension portion 30 extends, a second or front edge 54 opposite the rear edge 50, and third and fourth side edges 58, 62, respectively. The body portion 26 is generally rectangular in shape except that the corners are truncated at four corner edges 66. The body portion 26 of the base 22 can be formed of aluminum or other suitable metals or composites.

The front edge 54 of the body portion 26 includes a flange 70 that is bent or formed to be generally normal to the body portion 26. The flange 70 extends downwardly, away from the top surface 72 of the body portion 26. A trim member 74 is coupled to the flange 70 for reasons that will be discussed further below. The illustrated trim member 74 is an elongated, U-shaped vinyl piece that has a length that is generally the same length as the flange 70. The trim member 74 is coupled to the flange 70 by a press-fit engagement (e.g., an internal finger or fingers in the trim member 74 resiliently engages a surface of the flange 70) and/or with adhesive. When coupled to the flange 70, the trim member 74 is deemed to be part of the front edge 54.

The base 22 further includes one or more tabs 78 extending from the body portion 26. In the illustrated embodiment, there are four tabs 78 on the base 22, each tab 78 extending from a respective corner edge 66, downwardly and away from the top surface 72 of the body portion 26. The two tabs 78 adjacent the rear edge 50 each form an angle of about eighty-five degrees between an inside surface of the tab 78 and the underside of the body portion 26. The two tabs 78 adjacent the front edge 54 each form an angle of about ninety degrees between an inside surface of the tab 78 and the underside of the body portion 26. As will be described in more detail below, the tabs 78 facilitate alignment, operation, and robustness of the keyboard mounting assembly 10.

A portion of a latch mechanism 82 is also coupled with the base 22. In the illustrated embodiment, a latch 86 of the latch mechanism 82 is coupled with a flange 90 (see FIG. 4) extending downwardly from the rear edge 50 of the body portion 26. The latch 86 is an R4 Push-to-Close latch available from Southco of Concord, Pa. The latch 86 includes a release lever 94 for opening the latch 86. An optional cover 98 can be placed on the release lever 94 for user comfort. Of course, other suitable latches and mounting means can be substituted for the latch 86 and latch mounting arrangement illustrated.

Figure 7:
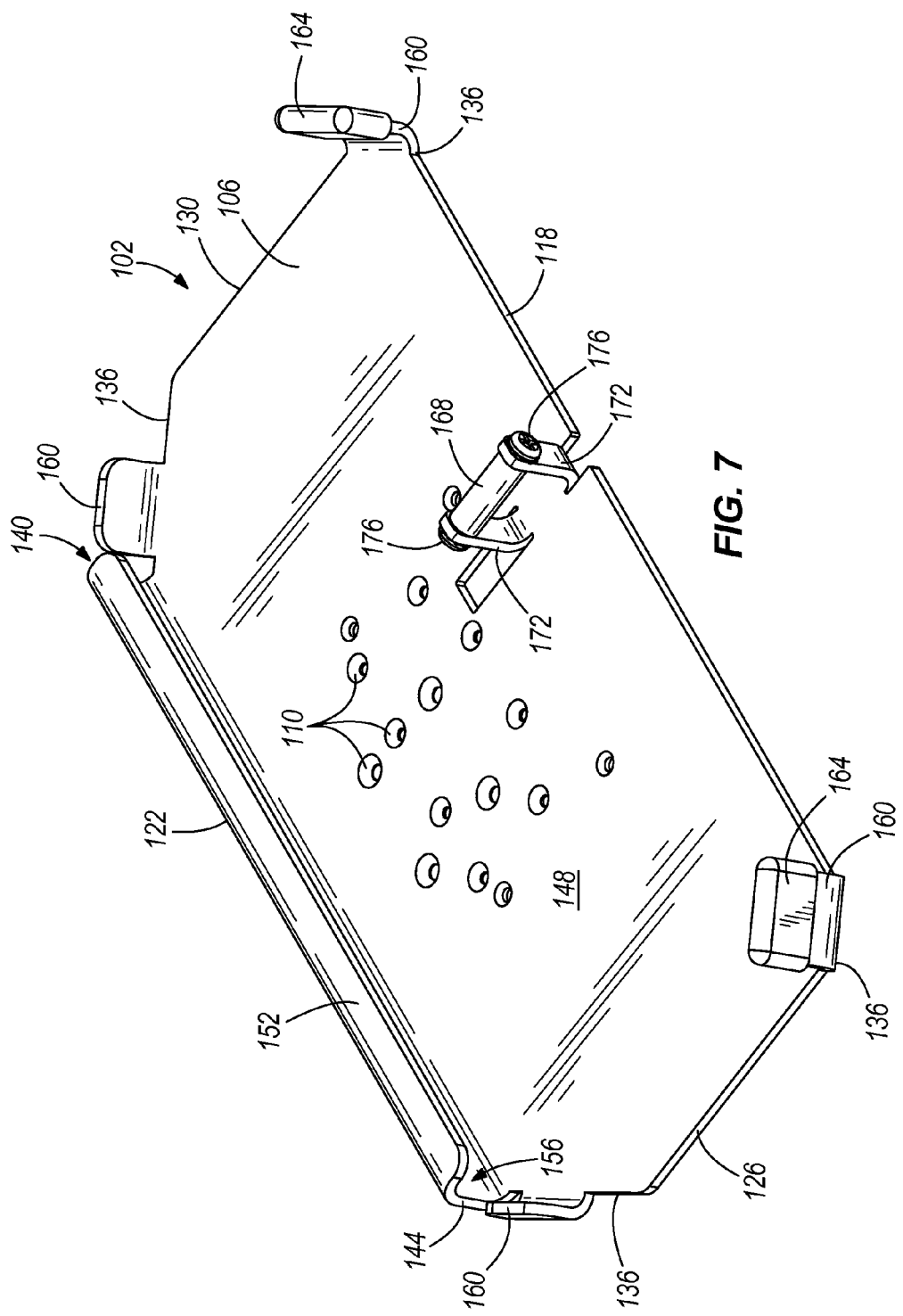
FIG. 7 is a perspective view of the keyboard tray assembly of the keyboard mounting apparatus of FIG. 1.

With reference now to FIG. 7, the keyboard mounting assembly 10 further includes a keyboard tray 102 having a generally planar support portion 106 configured to engage and support the keyboard 14. The support portion 106 includes apertures 110 for receiving fasteners 114 (see FIG. 4) that secure the keyboard 14 to the support portion 106 of the keyboard tray 102. The apertures 110 are arranged to correspond with threaded apertures in the underside of the keyboard 14, and the pattern of the apertures 110 can vary as desired. The illustrated keyboard tray 102 is configured with apertures 110 corresponding with mating apertures in a Panasonic PDRC keyboard, however other keyboards can also be secured to the keyboard tray 102. In other embodiments, the keyboard can be coupled to the keyboard tray in other ways.

The support portion 106 has a first or rear edge 118, a second or front edge 122 opposite the rear edge 118, and third and fourth side edges 126, 130, respectively. The support portion 106 is generally rectangular in shape except that the corners are truncated at four corner edges 136. The support portion 106 of the keyboard tray 102 can be formed of aluminum or other suitable metals or composites.

Figure 2:
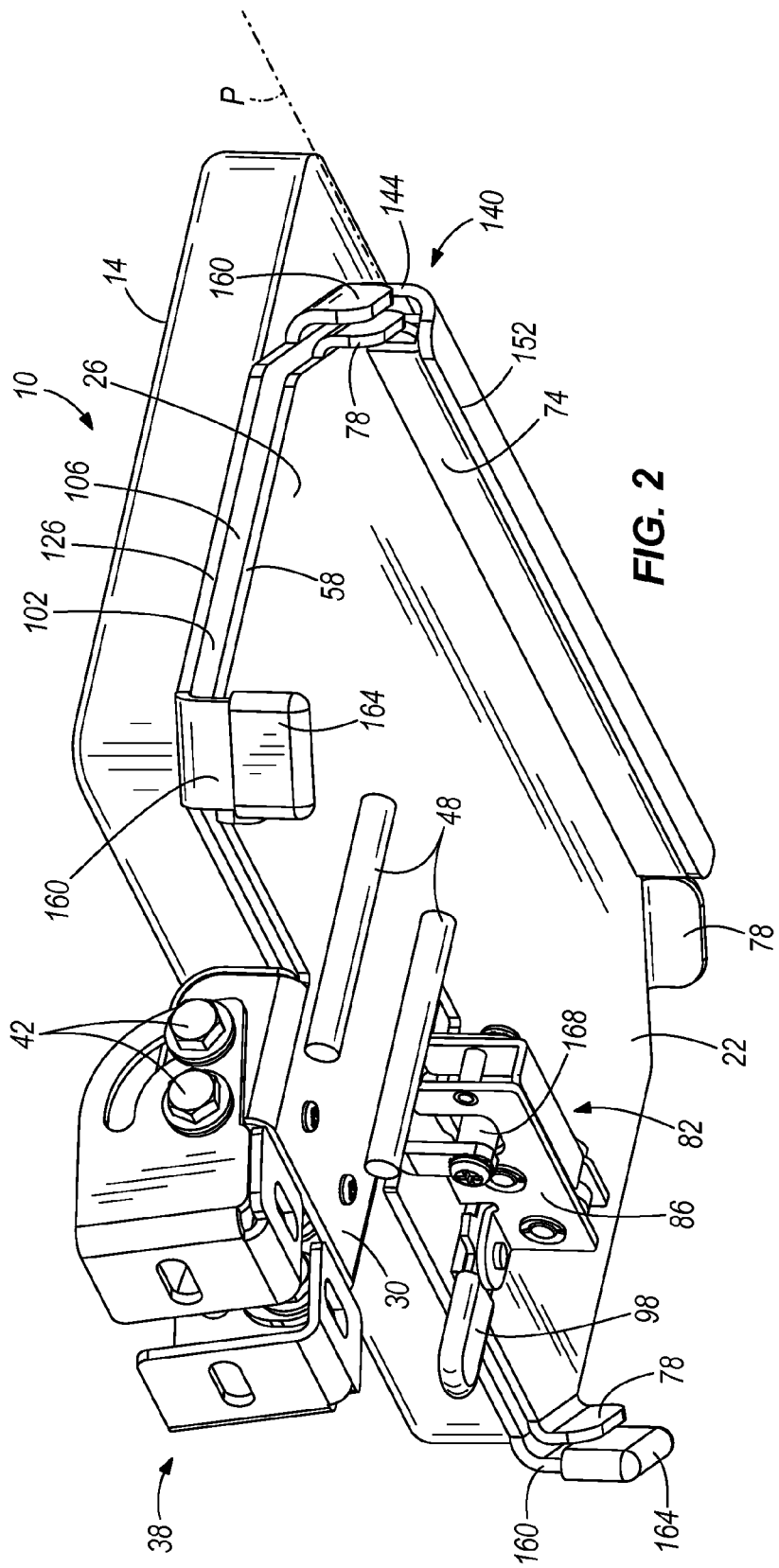
FIG. 2 is a bottom perspective view of the keyboard mounting apparatus of FIG. 1, showing a latched and secured orientation.
Figure 3:
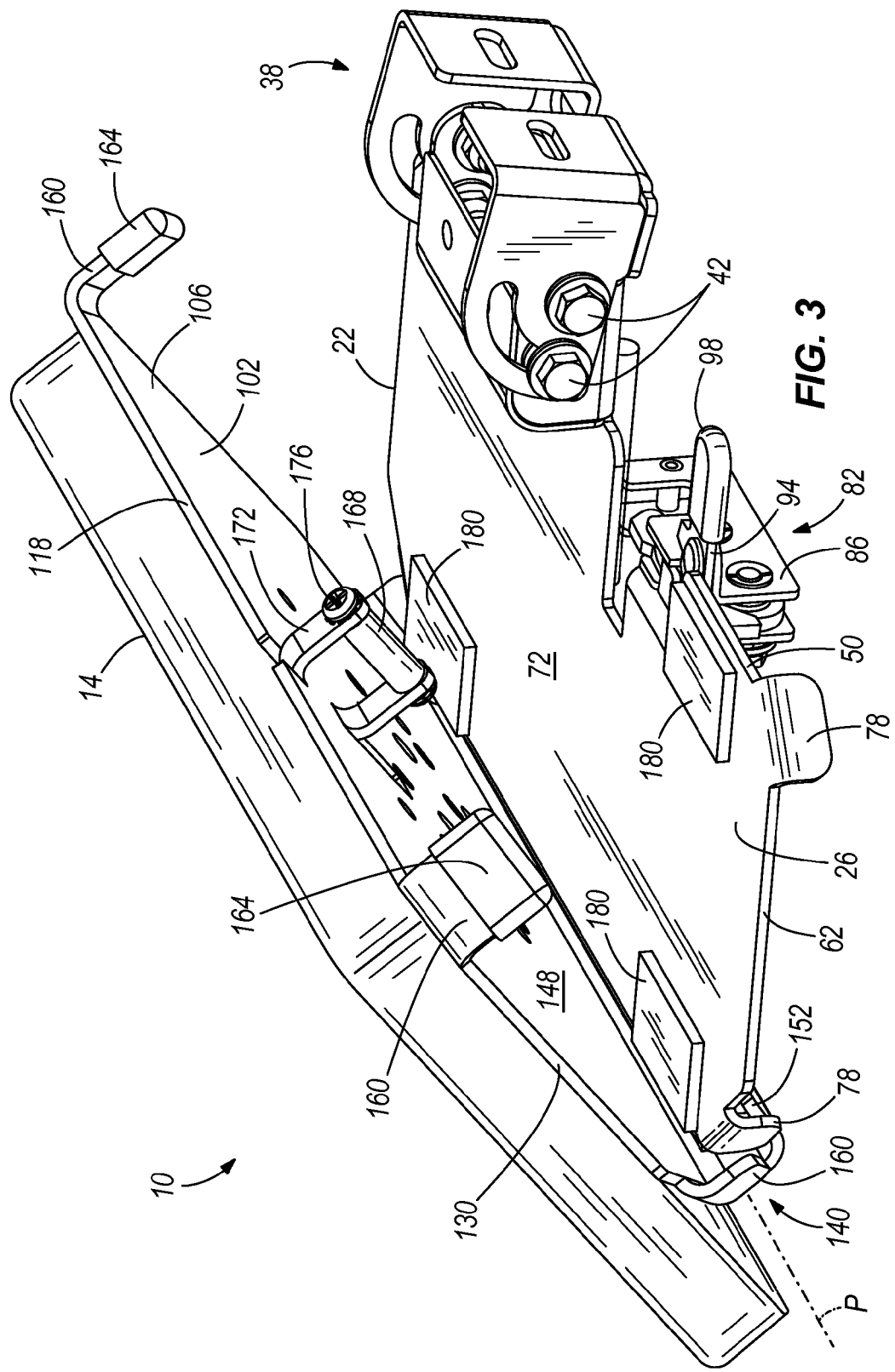
FIG. 3 is a perspective view of the keyboard mounting apparatus of FIG. 1, showing an unlatched and unsecured orientation.

The front edge 122 of the support portion 106 defines an edge-engaging portion 140 of the keyboard tray 102 that is configured to releasably engage the front edge 54 of the base 22 (see FIGS. 2 and 3). In the illustrated embodiment, the edge-engaging portion 140 is defined by a first flange portion 144 extending from the support portion 106 away from the bottom surface 148 of the support portion 106, and a second flange portion 152 extending from the first flange portion 144 in a direction generally toward the rear edge 118 of the support portion 106. The edge-engaging portion 140 can be bent or otherwise formed to the illustrated configuration. Together, the bottom surface 148 of the support portion 106 and the first and second flange portions 144, 152 define a generally U-shaped channel 156 sized and configured to receive the flange 70 of the base 22 and the trim member 74 therein.

Figure 8:
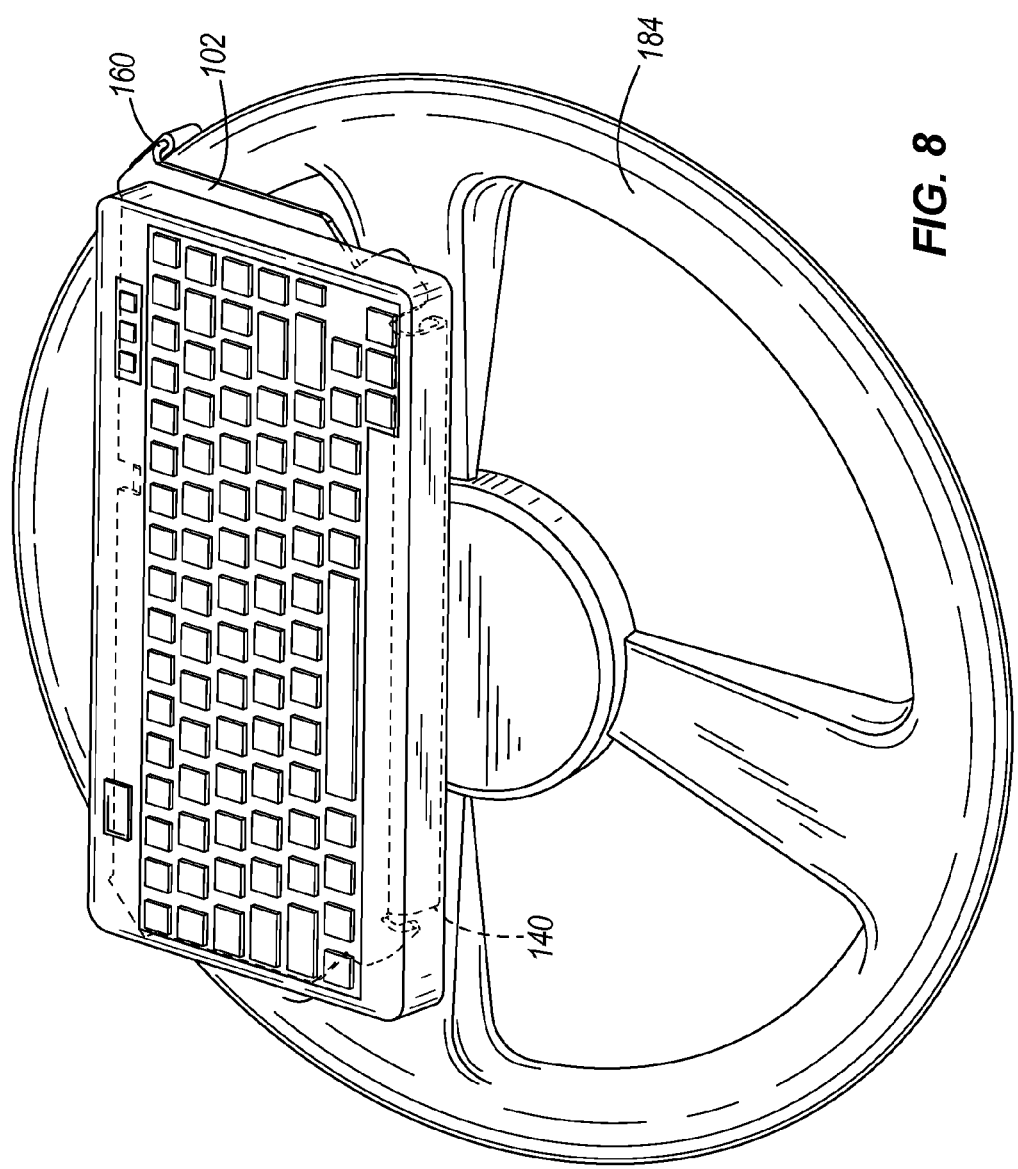
FIG. 8 is a perspective view of the keyboard tray assembly coupled with a vehicle's steering wheel.

When the edge-engaging portion 140 and the front edge 54 of the base 22 are not engaged (i.e., the flange 70 and the trim member 74 are not received in the generally U-shaped channel 156), the keyboard tray 102 is in its disengaged position, separated from the base 22 (see FIGS. 4, 7, and 8). The keyboard 14 can be a wired keyboard with a wire that is long enough, and optionally configured like a coil spring, to permit movement and usage of the keyboard 14 when in its disengaged position (e.g., as shown in FIG. 8). Alternatively, the keyboard 14 can be a wireless keyboard operable to transmit signals to the computer without requiring physical wires.

When the edge-engaging portion 140 receives and engages the front edge 54 of the base (i.e., the flange 70 and the trim member 74 are received in the generally U-shaped channel 156), the keyboard tray 102 is in its engaged position relative to the base 22 (see FIGS. 1-3). No fasteners or other locking mechanisms are used to secure the edge-engaging portion 140 to the front edge 54. When in this engaged position, the keyboard tray 102 is pivotably movable about a pivot axis P (see FIGS. 2 and 3) within the generally U-shaped channel 156 between a first position, in which the body portion 26 of the base 22 and the support portion 106 of the keyboard tray 102 are not parallel to one another (see FIG. 3), and a second position, in which the body portion 26 of the base 22 and the support portion 106 of the keyboard tray 102 are generally parallel to one another (see FIG. 2). More specifically, in the illustrated embodiment, the generally planar top surface 72 of the body portion 26 is generally parallel to the generally planar bottom surface 148 of the support portion 106 when the keyboard tray 102 is in its second position shown in FIG. 2. Of course, the body portion 26 and the support portion 106 need not be generally planar to achieve generally parallel orientations relative to one another. The trim member 74 can eliminate some or all of the metal-to-metal contact between the edge-engaging portion 140 of the keyboard tray 102 and the front edge 54 of the base 22, and can also help to take up space in the generally U-shaped channel 156 that may be a result of manufacturing tolerances, thereby resulting in smooth pivotal movement between the first and second positions and a snug fit within the generally U-shaped channel 156 when in the second position.

The keyboard tray 102 further includes one or more tabs 160 extending from the support portion 106. In the illustrated embodiment, there are four tabs 160 on the keyboard tray 102, each tab 160 extending from a respective corner edge 136, downwardly and away from the bottom surface 148 of the support portion 106. Each of the tabs 160 forms an angle of about ninety degrees relative to the support portion 106. The four tabs 160 are generally aligned with and correspond to the respective four tabs 78 of the base 22 to guide initial engagement of the keyboard tray 102 to the base 22, and to guide pivotal movement of the keyboard tray 102 from the first position to the second position. More specifically, when preparing to engage the front edge 54 of the base with the edge-engaging portion 140 of the keyboard tray 102, the tabs 160 at the corners adjacent the front edge 122 of the keyboard tray 102 are aligned with the two tabs 78 at the corners adjacent the front edge 54 of the base. This helps align the keyboard tray 102 laterally (i.e., side-to-side) relative to the base 22 for insertion of the flange 70 and trim member 74 into the generally U-shaped channel 156 (see FIG. 3).

As the keyboard tray 102 is pivoted toward the second position, these front tabs 160 and 78 provide continued guidance to maintain lateral alignment of the keyboard tray 102 relative to the base 22. The tabs 160 at the corners adjacent the rear edge 118 of the keyboard tray 102 can also cooperate with the tabs 78 at the corners adjacent the rear edge 50 of the base 22 when the keyboard tray 102 approaches and ultimately reaches the second position. Any lateral misalignment will be corrected automatically by engagement of these rear tabs 160 and 78. These rear tabs 160 and 78 can also facilitate the front-to-rear alignment of the keyboard tray 102 relative to the base 22. The rear tabs 160 can include optional covers 164 made of a resilient material (e.g., vinyl) to facilitate guidance of the rear tabs 160 over the rear tabs 78 without substantial metal-to-metal contact that could result in wear and undesirable noise. In some embodiments, one or both of the rear tabs 160 can further function as an interlock mechanism between the keyboard tray 102 and the base 22 that is operable to secure the keyboard tray 102 in the second position. These rear tabs 160 can be configured to engage the rear tabs 78 or could engage another portion of the base 22 to resiliently and releasably secure the keyboard tray 102 in the second position.

The illustrated embodiment of the keyboard tray 102 further includes a striker bolt 168 that cooperates with the latch 86 to define the mating component of the latch mechanism 82 between the keyboard tray 102 and the base 22. Of course, the latch mechanism 82 could have the reverse configuration, in which the latch 86 is on the keyboard tray 102 and the striker bolt 168 is on the base 22. The striker bolt 168 is supported below the bottom surface 148 of the support portion 106 by projections 172. The illustrated projections 172 are formed from the material defining the support portion 106, and are bent downwardly as shown. Fasteners 176 couple the striker bolt 168 to the projections 172. Of course, the projections 172 could alternatively be separate pieces coupled to the bottom surface 148 of the support portion 106. The striker bolt 168 is aligned with the latch 86 so that as the keyboard tray 102 is pivoted to the second position, the latch 86 receives the striker bolt 168 therein and automatically catches and secures the striker bolt 168, thereby securing the keyboard tray 102 in the second position. The latch mechanism 82 functions as an interlock mechanism between the keyboard tray 102 and the base 22 that is operable to secure the keyboard tray 102 in the second position.

One or more resilient pads 180 are positioned between the top surface 72 of the body portion 26 and the bottom surface 148 of the support portion 106 to act as dampening or shock-absorbing members between the keyboard tray 102 and the base 22 when the keyboard tray 102 is in the second position. In the illustrated embodiment, four pads 180 are secured (e.g., via adhesive) to the top surface 72 in the vicinity of the four corners of the body portion 26. Of course fewer or more pads 180 could be used, and the positioning could be varied. In other embodiments, the pads 180 could be secured to the bottom surface 148 of the support portion 106. The illustrated pads 180 are made of semi-open-celled elastomer, such as that sold under the trademark PORON, available from Rogers Corporation of Rogers, Conn.

The latch mechanism 82 is configured so that when the keyboard tray 102 is latched and secured in the second position, the resilient pads 180 are compressed between the body portion 26 and the support portion 106. This helps to minimize relative movement and vibration between the keyboard tray 102 and the base 22 that could result in wear and undesirable noise. The amount of compression can be controlled by the diameter and placement of the striker bolt 168 relative to the latch 86, as well as by the thickness of the pads 180. The compressed pads 180 further facilitate initiation of movement of the keyboard tray 102 from the second position toward the first position when the release lever 94 of the latch 86 is actuated by the user. In other words, the compressed pads 180 function like springs to help lift the striker bolt 168 out of the latch 86 when the release lever 94 is actuated.

Operation of the keyboard mounting assembly 10 will now be described. Once the base 22 has been mounted to the desired support member 18 via the mounting bracket 38, and the keyboard 14 has been secured to the keyboard tray 102 via the fasteners 114, a user can install the keyboard tray 102 to the base 22 to achieve the engaged position. As shown in FIG. 4, the user can, with one hand, hold the keyboard 14 and attached keyboard tray 102 and align the edge-engaging portion 140 with the front edge 54 of the base 22. As described above, the front tabs 160 can be generally aligned with the front tabs 78 to achieve proper lateral alignment as the flange 70 and the attached trim member 74 are received into the generally U-shaped channel 156, as shown in FIG. 3. Once engaged, the keyboard tray 102 is in the first position, in which the support portion 106 is in non-parallel or angled relation to the body portion 26. No manual inter-engagement or manipulation of fasteners is required to achieve the engaged position.

Next, the user pivots the keyboard 14 and keyboard tray 102 toward the second position. The engagement between the trim member 74 and the generally U-shaped channel 156 provides a smooth pivoting motion, and the front tabs 160 and 78 guide the pivoting to maintain lateral alignment. As the keyboard tray 102 approaches the second position, the rear tabs 160 can engage the rear tabs 78 for continued guidance and alignment. The striker bolt 168 is received in and eventually automatically captured by the latch 86 to secure the keyboard tray 102 in the second position shown in FIGS. 1 and 2. With the keyboard tray 102 in the second position, it is secured to the base 22 by virtue of the latch mechanism 82, the engagement of the front edge 54 within the generally U-shaped channel 156, and perhaps also by the engagement between the tabs 160, 78. Each of the trim member 74, the pads 180, and the covers 164 provide dampening and shock-absorbing functionality so any relative movement between the keyboard tray 102 and the base 22 is minimized or eliminated. Furthermore, these features reduce or eliminate metal-to-metal contact that could otherwise result in wear and in undesirable rattling and noise during vibration (especially in mobile environments like vehicles). No manual inter-engagement or manipulation of fasteners is required to achieve the second position.

To release the keyboard 14 and keyboard tray 102 from the base 22, the user, needing only one hand, can grasp the keyboard 14 and keyboard tray 102 at the rear edge 118 adjacent the release lever 94, and at the same time and with the same hand, actuate the release lever 94. The spring-like action of the compressed pads 180 will assist in moving the striker bolt 168 out of the latch 86 and the user can then pivot the keyboard 14 and keyboard tray 102 toward the first position shown in FIG. 3. Still using a single hand, the user can then disengage the edge-engaging portion 140 from the front edge 54 of the base 22, thereby releasing the keyboard tray 102 from the base 22 (i.e., the disengaged position of the keyboard tray 102).

If desired, the user can hang the keyboard 14 and keyboard tray 102 on the steering wheel 184 of a vehicle as shown in FIG. 8. The two rear tabs 160 hang on and are coupled to the steering wheel 184 via gravity as shown. The edge-engaging portion 140 rests on the central portion of the steering wheel 184 such that the user can type on the keyboard 14 while seated in the driver's seat.

The keyboard mounting assembly 10 has been described above with respect to the illustrated embodiment, however, those of skill in the art will understand that modifications can be made without deviating from the scope of the invention. For example, the illustrated configuration of the edge-engaging portion 140 of the keyboard tray 102 and the front edge 54 of the base 22 is only one example of a suitable arrangement. While the illustrated edge-engaging portion 140 receives the flange 70 and the trim member 74 therein for engagement, in other embodiments, the edge-engaging portion of the keyboard tray and the edge of the base could take other forms. The edge-engaging portion could be designed to be pivotably received within some geometry (e.g., a channel or recess) formed at the front edge of the base. In other words, other structure and geometry can be substituted to achieve the pivoting engagement between the keyboard tray and the base, and such other structure is contemplated by the present invention.

Furthermore, the number, positioning, and configuration of the tabs 160 and 78 could vary as desired. For example, instead of being integrally formed and bent from the respective body and support portions 26, 106, the tabs could be separate pieces coupled thereto. Additionally, one or more mating tabs could be positioned on the side edges 58, 62, 126, 130, or on the rear edges 50, 118 instead of at the corner edges 66, 136. Alternatively, the tabs 160 could be configured to engage the body portion 26 directly instead of mating with other tabs of the base 22. As mentioned above, one or more tabs can function as an interlock mechanism to secure the keyboard tray to the base, either on its own, or in conjunction with the latch mechanism 82. Other arrangements can also be substituted to function as an interlock mechanism.

Various features and advantages of the invention are set forth in the following claims.

What is claimed is:

1. A keyboard mounting assembly comprising:
a base having a body portion with a peripheral edge;

a flange extending downwardly from the peripheral edge in a direction generally normal to the body portion;

a keyboard tray having a support portion configured to support a keyboard, the keyboard tray further including an edge-engaging portion defining a generally U-shaped channel sized and configured to releasably receive the peripheral edge and the flange of the base for pivotal movement about the peripheral edge and the flange between a first position, in which the body portion of the base and the support portion of the keyboard tray are not parallel to one another, and a second position, in which the body portion of the base and the support portion of the keyboard tray are generally parallel to one another; and an interlock mechanism coupled to one of the base and the keyboard tray and a locking piece coupled to the other one of the base and the keyboard tray, wherein pivoting the keyboard tray to the second position automatically causes the locking piece to be received by the interlock mechanism to releasably secure the base and the keyboard tray in the second position.

2. The keyboard mounting assembly of claim 1, further comprising a trim member coupled to the flange.

3. The keyboard mounting assembly of claim 1, wherein the base includes a tab extending from the body portion and wherein the keyboard tray includes a tab extending from the support portion, the tabs being aligned to guide pivotal movement of the keyboard tray from the first position to the second position.

4. The keyboard mounting assembly of claim 3, wherein the tab on the base is angled at about 85 degrees between an inside surface of the tab and an underside of the body portion, and wherein the tab on the keyboard tray is angled at about 90 degrees relative to the support portion.

5. The keyboard mounting assembly of claim 3, wherein the tab on the base is one of four tabs on the base, each tab on the base positioned generally at a corner of the body portion, and wherein the tab on the keyboard tray is one of four tabs on the keyboard tray, each tab on the keyboard tray positioned generally at a corner of the support portion.

6. The keyboard mounting assembly of claim 3, further comprising a cap on the tab of the keyboard tray.

7. The keyboard mounting assembly of claim 1, further comprising a resilient pad positioned between the body portion of the base and the support portion of the keyboard tray when the keyboard tray is in the second position.

8. The keyboard mounting assembly of claim 7, wherein the resilient pad is compressed between the body portion and the support portion when the interlock mechanism secures the keyboard tray in the second position.

9. The keyboard mounting assembly of claim 1, wherein the interlock mechanism includes a latch mechanism arranged between the base and the keyboard tray.

10. The keyboard mounting assembly of claim 1, further comprising a mounting bracket coupled to the base, the mounting bracket configured to couple the keyboard tray assembly to a support member.

11. The keyboard mounting assembly of claim 1, wherein the support portion of the keyboard tray includes apertures for receiving fasteners that secure a keyboard to the support portion.

12. The keyboard mounting assembly of claim 1, wherein the keyboard tray has a disengaged position in which the edge-engaging portion is disengaged from the edge to release the keyboard tray from the base.

13. The keyboard mounting assembly of claim 1, wherein keyboard tray includes a tab extending from the support portion, and wherein the interlock mechanism is defined at least in part by the tab engaging the base.

14. The keyboard mounting assembly of claim 1, wherein the generally U-shaped channel of the edge-engaging portion is defined by a first flange extending downwardly from the support portion of the keyboard tray and a second flange extending from the first flange toward a rear of the support portion.

15. A keyboard mounting assembly comprising:

a base having a body portion with a planar top surface and a peripheral edge;

a flange extending downwardly from the peripheral edge;

a keyboard tray having a support portion configured to support a keyboard, the keyboard tray further including an edge-engaging portion with a cross section sized and shaped to fit over and releasably receive the peripheral edge and the flange of the base, the keyboard tray having a disengaged position in which the edge-engaging portion is disengaged from the peripheral edge and the flange to release the keyboard tray from the base, and an engaged position in which the peripheral edge and flange are received by the edge-engaging portion, wherein when the keyboard tray is in the engaged position the keyboard tray is pivotably movable about a pivot axis defined within the cross section of the edge-engaging portion between a first position, in which the body portion of the base and the support portion of the keyboard tray are not parallel to one another, and a second position, in which the body portion of the base and the support portion of the keyboard tray are generally parallel to one another; and an interlock mechanism coupled to one of the base and the keyboard tray and a locking piece coupled to the other one of the base and the keyboard tray, the interlock mechanism operable to releasably receive the locking piece and secure the base and the keyboard tray in the second position, wherein the planar top surface of the base is sized and shaped to support the keyboard tray.

16. The keyboard mounting assembly of claim 15, wherein the edge-engaging portion of the keyboard tray extends from the support portion and defines therewith a generally U-shaped channel, wherein the keyboard mounting assembly further includes a trim member coupled to the flange, and wherein the flange and the trim member are received in the U-shaped channel when the keyboard tray is in the engaged position.

17. The keyboard mounting assembly of claim 16, wherein the generally U-shaped channel of the edge-engaging portion is defined by a first flange extending downwardly from the support portion of the keyboard tray and a second flange extending from the first flange toward a rear of the support portion.

18. The keyboard mounting assembly of claim 15, further comprising a resilient pad positioned between the body portion of the base and the support portion of the keyboard tray when the keyboard tray is in the second position, wherein the resilient pad is compressed between the body portion and the support portion when the interlock mechanism secures the keyboard tray in the second position.

19. The keyboard mounting assembly of claim 15, further comprising a mounting bracket coupled to the base, the mounting bracket configured to couple the keyboard tray assembly to a support member.

20. The keyboard mounting assembly of claim 15, wherein the interlock mechanism includes a latch mechanism.

21. The keyboard mounting assembly of claim 15, further comprising a tab extending from the body portion and a tab extending form the support portion generally aligned with the tab on the body portion to guide movement between the first position and the second position.

22. The keyboard mounting assembly of claim 21, wherein the tab on the base is one of four tabs on the base, each tab on the base positioned generally at a corner of the body portion, and wherein the tab on the keyboard tray is one of four tabs on the keyboard tray, each tab on the keyboard tray positioned generally at a corner of the support portion.

23. The keyboard mounting assembly of claim 21, wherein the tab on the keyboard tray is one of two tabs on the keyboard tray, the two tabs on the keyboard tray spaced apart from one another so as to enable coupling the keyboard tray to a steering wheel using the two tabs, when the keyboard tray is in its disengaged position.

24. The keyboard mounting assembly of claim 21, wherein the interlock mechanism includes the tab on the keyboard tray engaging the base.

25. The keyboard mounting assembly of claim 15, wherein pivoting the keyboard tray to the second position automatically causes the keyboard tray to releasably secure the base and the keyboard tray in the second position.

\* \* \* \* \*